Sept. 20, 1960 A. V. C. DAVIS 2,953,150
FLOW PROPORTIONING DEVICE
Filed June 21, 1956 2 Sheets-Sheet 1
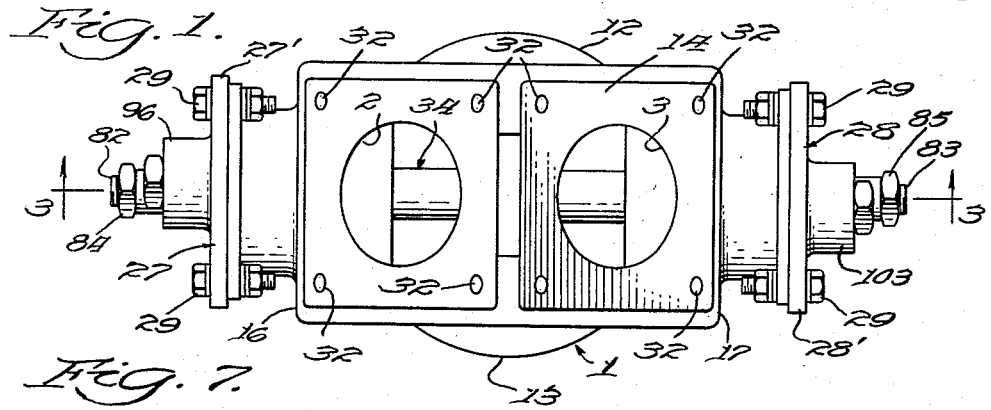
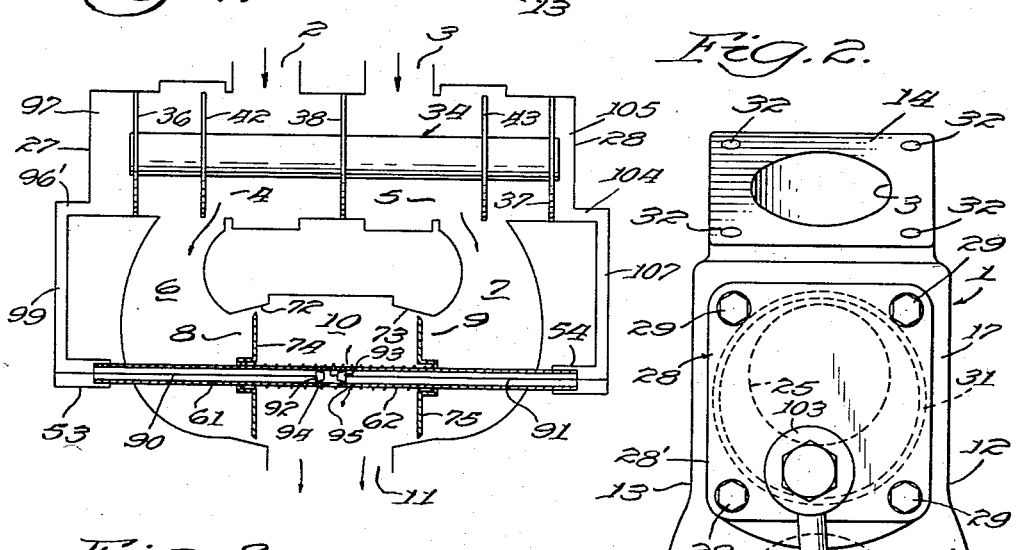
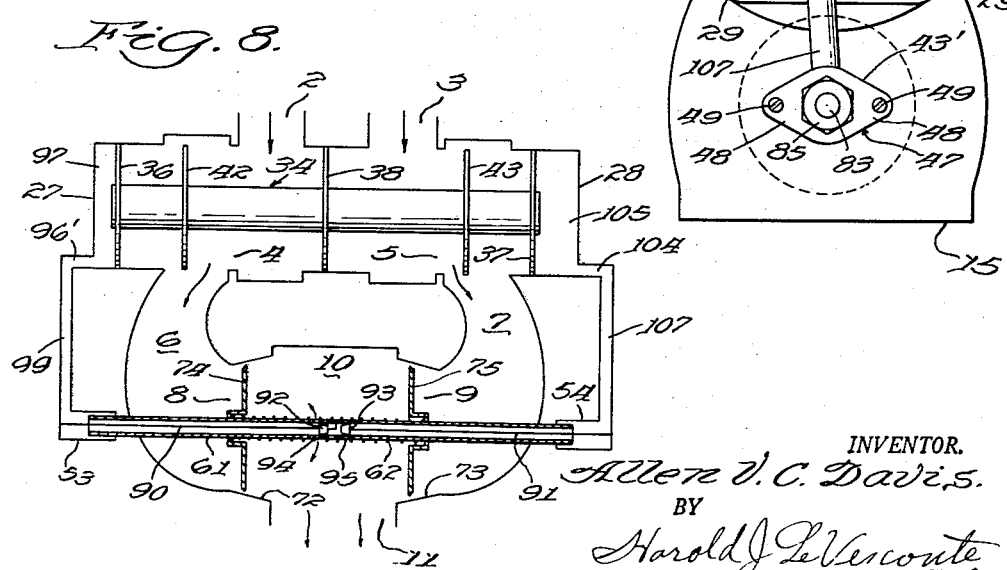
INVENTOR.
Allen V. C. Davis
BY
Harold J. LeVercoute
Atty.

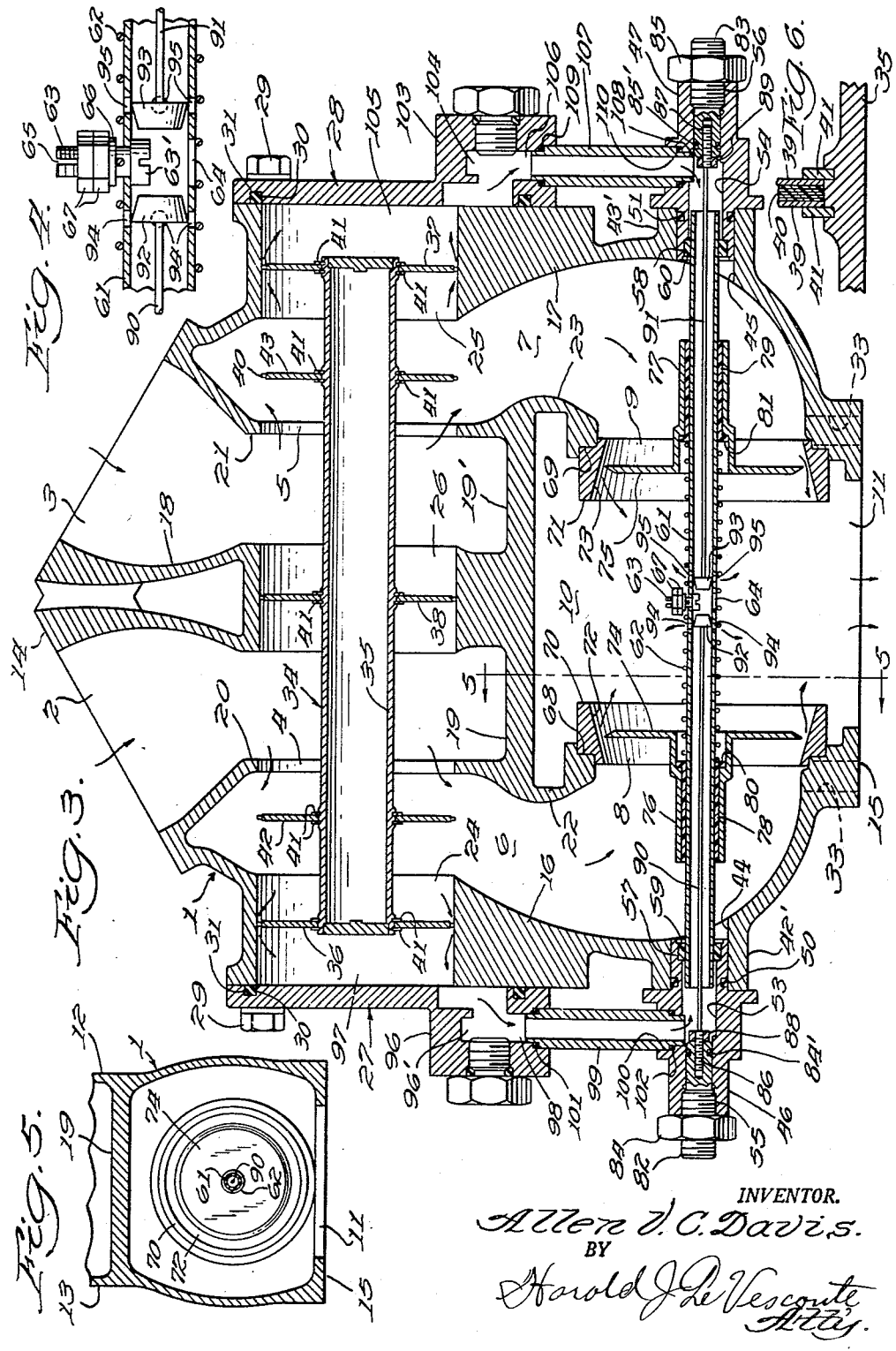

United States Patent Office 2,953,150
Patented Sept. 20, 1960

2,953,150

FLOW PROPORTIONING DEVICE

Allen V. C. Davis, Burbank, Calif.
(5600 Alta Canyada Road, La Canada, Calif.)

Filed June 21, 1956, Ser. No. 592,811

14 Claims. (Cl. 137—99)

This invention relates to flow proportioning devices and more particularly to an improved form of flow proportioning device especially adapted for accurately proportioning the flows of fluids from two sources and capable of sensing and accommodating dynamic pressure differentials in the inlet side of as little as .2 p.s.i. while handling such fluids at rates of flow ranging as high as 40,000 pounds per hour.

The principal object of the invention is to provide a flow proportioning device for receiving fluid flow from two sources at slightly varying head pressures and combining the two input flows into a single output flow which is composed of predetermined proportions of the input flows and in which said proportions are maintained regardless of variations in the input pressure differential of the flows of fluids.

Another object of the invention is to provide a flow proportioning device combining a primary flow proportioning element and a secondary flow proportioning mechanism for achieving a finer proportioning of the flows than that which could be achieved solely by the primary element and including a pilot valve mechanism actuated by said secondary mechanism serving to increase the sensitivity of the response of the primary element to imposed pressure differentials.

Still another object of the invention is to provide a proportioning device for controlling the flow of fuel from a plurality of tanks on an airplane whereby equal amounts of fuel are taken from each tank regardless of variations in head pressures deriving from changes in the attitude of the plane while in flight with resultant maintenance of equal wing loading at all times.

With the foregoing objects in view, together with such additional objects and advantages as may subsequently appear, the invention resides in the parts, and in the construction, combination and arrangement of parts described, by way of example, in the following specification of a presently preferred embodiment of the invention, reference being had to the accompanying drawings which form a part of said specification and in which drawings:

Fig. 1 is a top plan view of a device embodying the invention,

Fig. 2 is a right hand end elevational view of the device,

Fig. 3 is an enlarged scale, medial sectional view taken on the line 3—3 of Fig. 1, Fig. 4 is a further enlarged, fragmentary, medial sectional view of the pilot valve mechanism, Fig. 5 is a fragmentary, reduced scale sectional view taken on the line 5—5 of Fig. 3, Fig. 6 is a greatly enlarged, fragmentary sectional view of one of the primary metering valve disc assemblies, and Figs. 7 and 8 are diagrammatic views similar to Fig. 3, showing the reaction and accomodation of the device to differential dynamic pressures with the superior dynamic pressure applied to the left and right hand inlet ports, respectively.

In the following description of an embodiment of the invention, the terms top, upper, lower, right, left, etc. are employed for convenience only and have relation to the position shown in the drawings; it being understood that in use, the device may be in different positions depending on the attitude of the aircraft.

Referring to the drawings and particularly Figs. 1 through 5, the illustrated embodiment of the invention comprises, a hollow body 1 having left and right inlet orifices 2 and 3 communicating, respectively with left and right primary metering orifices 4 and 5 and which, in turn, separately communicate through passages 6 and 7 with secondary metering orifices 8 and 9 both of which communicate with an outlet chamber 10 having an outlet orifice 11. Structurally, the body 1 comprises a casting having side walls 12 and 13, a top wall 14 through which the inlet orifices 2 and 3 extend, a bottom wall 15 through which the outlet orifice 11 extends, and left and right end walls 16 and 17. The body 1 further includes a vertical center wall portion 18 separating the inlet orifices; said center wall portion terminating at about the mid-height of the body 1 in left and right horizontal portions 19 and 19' which at their distal ends join left and right intermediate walls 20 and 21 which at their upper ends combine with the center wall portion to define the inlet orifices and through which, adjacent their lower ends, the primary metering orifices 4 and 5 extend. The distal ends of the horizontal wall portions also unite with depending walls 22 and 23 through which the secondary metering orifices extend and which walls combine with the horizontal wall portions 19 and 19' to define the outlet chamber 10.

The body 1 is provided with a transverse bore extending through both end walls 16 and 17, both intermediate walls 20 and 21 and the center wall portion 18 with resultant formation of the primary metering orifices 4 and 5 and guidance bores 24, 25 and 26 in the end walls 16 and 17 and the center wall 18, respectively. End plates 27 and 28 secured to the outer faces of the end walls 16 and 17 by bolts 29 extending through flanges 27' and 28' close the ends of the said transverse bore; said plates each having a circular groove 30 formed on the inner face thereof and containing a compressible ring gasket 31 which engages the end wall surface to seal the joint between the end wall and the end plate attached thereto. Connection of the body 1 between the fluid conduits and the inlet and outlet orifices may be of any desired character; the illustrated embodiment being adapted for connection by flanged fittings bolted thereto by bolts or screws engaging the holes 32 surrounding the inlet orifices and the holes 33 similarly surrounding the outlet orifice.

Freely slidable in the transverse bore in response to differentials in dynamic pressure imposed thereon is a primary flow metering element 34 resembling a spool valve in configuration and comprising a thin walled tube 35 closed at both ends and having a length which is shorter than the length of the transverse bore between the plates 27 and 28 by an amount which is not greater than the length of any one of the guidance bores 24, 25 or 26, whereby the said metering element will have a path of travel in said transverse bore substantially equal to the length of the guidance bores. Mounted on each end of the tube 35 and at the mid length thereof are guiding disc assemblies 36, 37 and 38 each comprising a pair of thin metal plates 39 somewhat smaller in diameter than the bores in which they are disposed and a plurality of thin plastic discs 40 having a diameter closely fitting, but freely slidable in the guidance bores.

The wall of the tube 35 is increased in thickness at the points on which the said disc assemblies are mounted and the disc assemblies are held thereon by snap rings 41 engaging circumferential grooves in the exterior of the tube 35. Mounted on the tube 35 downstream of the orifice 4 and located inwardly of the disc assembly 36 by a distance substantially equal to the distance from the inner end of the guidance bore 25 to the metering orifice 4 is a dynamic pressure sensing and flow rate metering disc assembly 42 which is similar to the guiding disc assemblies previously described and is secured to the tube in the same manner. The tube 35 also carries a similar sensing and metering disc assembly 43 adjacent the opposite end thereof which is downstream of the orifice 5 and correspondingly spaced from the guiding disc assembly 37. By this spacing, if the metering element 34 is moved completely to either end of its travel, the metering disc assembly adjacent the opposite end of the metering valve element will be moved into the adjacent metering orifice with substantial stoppage of fluid flow therethrough. In practice, such extreme travel seldom, if ever, actually occurs, but the above relative proportioning of the parts has been employed as a convenient means of describing that part of the invention. The tube 35, being closed at each end thereof, will, of course, give the primary metering element 34 a degree of buoyancy in the fluid in which it is immersed. Since the reduction of friction between this element and the body contributes to the sensitivity of the device, the optimum condition for extreme sensitivity will be that at which the element 34 is rendered substantially weightless in the fluid in which it is immersed by reason of the degree of buoyancy thus imparted to it.

The secondary metering or proportioning means has been so termed by reason of the fact that it both acts directly in that capacity and by exercising a control over the action of the primary proportioning or metering means above described as will be apparent in the description of the operation of the apparatus which will follow the completion of the description of the illustrated embodiment.

The secondary metering or proportioning mechanism is interposed between the primary means and the outlet orifice and is conveniently disposed in parallel relation thereto. The end walls of the body 1 are provided with opposed axially aligned bosses 42' and 43' which are provided with axially aligned bores 45, 45 in which sleeve members 46 and 47 are mounted and secured (as shown in Fig. 2) by lateral flanges 48, 48 and screws 49, 49 engaging corresponding lateral extensions of the bosses 42' and 43'. Gaskets 50 and 51 seal the joint between the sleeve members and their respective bores. The sleeve members include axially disposed bores 53 and 54 extending therethrough; said bores terminating in threaded portions 55 and 56 at the outer ends thereof. The inner ends of the bores 53 and 54 are provided with counterbored portions 57 and 58 within which circular gasket elements 59 and 60 are held; said gaskets having an inner diameter slightly smaller than the diameter of the bores 53 and 54 and preferably being of a somewhat rigid plastic material such as Teflon. A tube 61 extends between the sleeve members 46 and 47 with the ends thereof closely fitting but freely slidable in the gaskets 59 and 60; said tube at its mid length carrying a compression spring 62 secured thereto at the exact "rate" center of the spring by a screw 63 extending through a wall of the tube with the head 63' of the screw disposed within the tube; the opposite wall of the tube being provided with a hole 64 for insertion of the screw. The shank of the screw is provided with a slot 65 in which the spring wire is received and a washer 66 and nuts 67 clamp the wire against the tube. By this means of securing the spring to the tube, the spring may be rotated about the tube with one coil thereof disposed in the slot 65 until it is positioned with its exact rate center in the slot and then secured by the washer and nuts. The lead of the spring is such that the distance between convolutions adjacent the convolution thus secured are free from interference with the securing means even when the spring is compressed to the maximum amount to which it may be subjected in use. Also, by placing the head of the screw within the tube, the free action of the spring is not interfered with by the screw head.

The walls 22 and 23 of the valve body are provided with counterbored seats 68 and 69 facing the outlet chamber 10 and mounted in these counterbores are the secondary metering orifice members 70 and 71 comprising rings having tapering inner faces 72 and 73 disposed coaxially with respect to the tube 61 and with the larger diameters of the rings disposed adjacent the outlet chamber 10. Slidably mounted on the tube 61 and disposed for movement within the areas of the orifice members 70 and 71 are secondary dynamic pressure responsive devices which include the opposed metering discs 74 and 75; said discs having an outer diameter only slightly smaller than the minor diameters of the inner faces of the orifice members. These secondary metering discs are respectively provided with sleeves 76 and 77 extending toward the ends of the tube 61 and disposed in said sleeves are bushings 78 and 79 preferably formed of a plastic having good bearing qualities and said bushings slidably engage the outer surface of the tube 61. Adjacent the metering discs, the sleeves are slightly enlarged to provide a seat for the correspondingly enlarged heads 80 and 81 of the bushings; said heads preferably being disposed well within the enlarged portion of the sleeve and being engaged by the ends of the spring 62 which is of such length as, in repose, to move the discs 74 and 75 to points equally close to the inner minor diameter portions of the orifice members 70 and 71.

The tube 61 additionally forms a component of a pilot valve means now to be described. Mounted in the threaded portions 55 and 56 of the sleeves 46 and 47 are studs 82 and 83 secured in adjusted position therein by locknuts 84 and 85 and sealed by gaskets 84' and 85'. The inner ends of these studs are internally threaded and receive stud elements 86 and 87 also secured in adjusted position therein by lock nuts 88 and 89. The outer ends of the studs 86 and 87 carry thin rods 90 and 91 extending into the tube 61 and terminating in frusto-conical pilot valve elements 92 and 93 having their larger ends closely fitting the inner diameter of the tube and having their smaller ends facing each other and when the tube 61 is centrally disposed in the body 1, equally spaced from the head of the screw 63. The wall of the tube 61 is provided with a first series of fluid discharge ports 94 which, when the device is adjusted for maximum sensitivity and the tube is centrally disposed, are opposite the pilot valve element 92 and slightly overlap the larger diameter of the said pilot valve element. The tube 61 is also provided with a second series of pilot valve fluid discharge ports 95 which are similarly disposed with respect to the pilot valve element 93.

The end member 27 is provided with an outwardly extending boss 96 containing a fluid passage 96' leading from the space 97 between the end plate 27 and the guiding disc 36 to a port 98 which is connected by a tube 99 with a port 100 communicating with the bore 53 in the sleeve member 46; gaskets 101 and 102 serving to seal the connection between the tube 99 and the ports 98 and 100. The end plate 28 is similarly provided with a boss 103 having a passage 104 leading from the space 105 between the end plate 28 and the guidance disc 37 to a port 106 which, in turn, is connected by a tube 107 with a port 108 communicating with the bore 54 in the sleeve 47; gaskets 109 and 110 serving to seal the connection of the tube 107 with the ports 106 and 108.

Assuming that fluid, e.g., fuel, is entering the inlet orifices 2 and 3 at equal head pressures, the primary metering element 34 will center itself in response to the dynamic pressures of the moving fluids imposed on the discs 42 and 43 so that the orifices 4 and 5 are equally open. Since the guidance discs 36 and 37 fit their respective bores loosely, the spaces 97 and 105 will be filled with fluid and will be equal in the static pressures exerted therein. Fluid passing through the orifices 4 and 5 passes through passages 6 and 7 to the secondary orifices 8 and 9 and displace the spring biased discs 74 and 75 to equal extents thus having no effect on the longitudinal position of the tube 61. At the same time, some of the fluid is passing through the tubes 99 and 107 into the ends of the tube 61 and thence through the equally slightly open pilot valve ports 94 and 95.

Next assuming that there is a change in the head pressures by which the dynamic pressure in port 2 is greater than in port 3, the first effect is to cause the primary metering element 34 to be moved to the right as shown in Fig. 7 with consequent partial closing of the orifice 4 and greater opening of the orifice 5 which is subjected to the lesser dynamic pressure. At the same time a portion of this pressure differential is imposed on the discs 74 and 75 and the disc 74 is moved against the spring to a greater extent than the disc 75 with a resultant shift of the tube 61 to the right at least as far as permitted by engagement of the screw head 63' with the end of the pilot valve element 93. This movement closes the pilot valve ports 94 in the tube 61 and opens the pilot valve ports 95, whereupon fluid is free to flow from the space 105 through the tube 107 and thence out of the ports 95 with a resultant pressure drop in the space 105. Since the fluid can thus escape faster from the space 105 than from the space 97, the primary metering element 34 is subjected to a pressure differential of greater extent than that actually occuring in the inlet orifices and is quickly moved to a position at which the flows are equalized at the desired proportion with the result that the sensitivity of the primary metering assembly as a whole is greatly increased. In the event of a superior dynamic pressure in the inlet orifice 3 the above recited conditions are reversed and the tube will be moved to the left (see Fig. 8) with resultant escape or dumping of fluid through the pilot valve ports 94 to cause a pressure drop in the space 97 at the left hand end of the element 34 and consequent primary metering movement of the primary metering element 34 to the left.

The fact that the valve elements 92 and 93 are adjustable axially of the tube 61 has been noted above. The highest sensitivity of the device is attained when these valve elements are adjusted as described. When they are adjusted further apart, a greater differential in the imposed dynamic pressures is required to shift the tube 61 to a point at which this "dumping" action occurs. Under such conditions the spring biased discs by their yielding opposition to flow create back pressure effects on the primary metering element and since the greater the imposed pressure, the greater the back pressure, the said back pressures combine with the input dynamic pressure effects to cause the primary metering element to move to tend to restrict the inlet flow having the greater dynamic pressure. When this differential becomes great enough to have moved the tube 61 to open the port therein communicating with the lower pressure side of the primary metering element, the response of the device is, of course accelerated. When thus adjusted, the device makes at least partial compensation for the lesser range of differentials in input pressures and complete compensation for differentials of greater magnitude such as surges in one or the other of the inlet lines.

While the foregoing description of the events attendant upon accommodation of the device to dynamic pressure differentials has been related as occuring sequentially, it will be appreciated that such accommodation actually occurs in such close proximity in time as to be substantially simultaneous and so far as actual operation is concerned, they may be considered as being simultaneous. Further, while Figs. 7 and 8 show the device in the extreme positions of accommodation to dynamic pressure differentials, it will be appreciated that the extents of such movements may be any lesser amount as will suffice for lesser differentials in pressure.

Thus, there has been provided a flow proportioning device which is solely and directly responsive to and actuated by input dynamic pressures and which, consequently, is particularly suited for conditions requiring accommodation to slight pressure differentials and in which the basic principle is the employment of an effect derived from the superior dynamic pressure to effect an increased pressure drop at the inferior pressure side of the device with the resultant great increase in the sensitivity of the device.

The term "dynamic pressure" as used in the specification and claims is employed to include the total pressures of the fluids including both their velocity and head pressures since the variations which the present invention is designed to meet may derive from changes in head pressures incident to changes in the attitude of the aircraft without change in the velocity, from changes in the velocity of the fluids without change in their head pressures, or from combinations of those changes.

While the foregoing specification discloses a presently preferred embodiment of the invention, it is not to be deemed that the invention is limited to the exact form thus disclosed by way of example, and it will be understood that the invention embraces all such changes in the parts, and in the construction, combination and arrangement of parts as shall come within the purview of the appended claims.

I claim:

1. In a flow proportioning device, a hollow body having two inlet orifices arranged side by side and spaced from each other by a partition, an outflow orifice for the combined flows into said inlet orifices and two fluid passages extending respectively one each between said outlet orifice and a point adjacent one each of said inlet orifices; said body having walls interposed between each of said inlet orifices and the adjacent ends of the associated fluid passages, a bore extending through said body and through said walls and said partition with resultant formation of bearing surfaces for a flow responsive metering element in said body side walls and said partition and further forming metering orifices in said walls between said passages and inlet orifices affording communication between said inlet orifices and the associated ones of said passages, means closing the ends of said bore, a spool type metering element of less length than said bore mounted for reciprocation in said bore and comprising a body member carrying a bearing disc at each end and at the mid length thereof loosely engaging the portions of said bore in said side walls and said partition; the lengths of said portions of said bores being slightly greater than the difference in length of said metering element and said bore; said metering element body further carrying flow rate controlling discs disposed at the downstream sides of said metering orifices and so disposed thereon that when said metering element is at mid travel position, said flow rate controlling discs will be spaced from their adjacent metering orifices by a distance which is substantially half the extent of travel of said metering element, separate fluid conducting means extending from each end of said bore to points slightly upstream of said outlet orifice, separate pilot valve means in each of said fluid conducting means, and devices responsive to differentials in the dynamic pressures of fluids entering said inlet orifices effective to open the one of said pilot valve means in the fluid conducting means connected to the end of said bore adjacent the inlet orifice subjected to the lesser dynamic pressure with resultant lessening of the inferior dynamic pressure resistance to movement of said metering element by the superior dynamic pressure and increase in the sensitivity of the metering element in the response thereof to input dynamic pressure differentials.

2. In a fluid flow proportioning device, a hollow body having two separate inlet orifices and separate passages leading one each from each of said inlet orifices to a single outlet orifice for the combined fluid flows of said inlet orifices; said passageways including primary metering orifices adjacent to said inlet orifices, a metering element responsive to differentials in the dynamic pressures in said inlet orifices and movable relative to said primary metering orifices to tend to restrict fluid flow through the one of said primary metering orifices subjected to a greater dynamic pressure than the other primary metering orifice and to simultaneously lessen the restriction to flow in the other of said primary metering orifices, pilot valve means controlling fluid flow through said conduit means and pilot valve operating devices both disposed downstream from said primary metering orifices responsive to the said dynamic pressures imposed thereon through said metering orifices to lessen the resistance of said metering element to the said greater dynamic pressure with resultant increase in the sensitivity of said metering element to respond to variations in dynamic pressure differentials in said inlet orifices; said controlling devices therefor comprising a pair of opposed secondary metering orifices situated on a common axial line and each affording communication between one each of said passages and said outlet orifice, a tube disposed in said axial line and mounted at each end for free endwise movement in supporting means carried by the end walls of said body, separate fluid conduit means extending from entrance orifices disposed at the ends of the space in which said element moves to discharge orifices in communication with the adjacent ends of said tube, a compression spring surrounding said tube and secured to the mid point of said tube at the rate center of said spring, a pair of metering discs slidingly mounted on said tube beyond the ends of said spring and at the downstream sides of said secondary metering orifices and being urged toward said orifices by the ends of said spring, a pair of pilot valve elements disposed within and closely fitting said tube and located adjacent the mid-length of said tube by stems carried by the tube end supporting means and extending within said tube, and at least two apertures extending through the wall of said tube disposed one each between each of said pilot valve elements and the mid-length point of said tube; said apertures being maintained substantially out of communication with the interior of the ends of said tube when said tube is held centered in its path of movement by the imposition of equal dynamic pressures on said discs and, in the event of imposition of differential dynamic pressures thereon with resultant shifting of said tube toward the side having the lesser dynamic pressure establishing communication between one of said apertures and the one of said separate fluid conduit means leading from the lower pressure side of said metering element subjected to the lesser dynamic pressure and consequent disabling of said metering element to resist the effect of the greater imposed dynamic pressure.

3. In a flow proportioning device, a hollow body having two inlet orifices arranged side by side and spaced from each other by a partition, an outflow orifice for the combined flows into said inlet orifices and two fluid passages extending respectively one each between said outlet orifice and a point adjacent one each of said inlet orifices; said body having walls interposed between each of said inlet orifices and the adjacent ends of the associated fluid passages, a bore extending through said body and through said walls and said partition with resultant formation of bearing surfaces for a metering element in said valve body side walls and said partition and further forming primary metering orifices in said walls between said passages and inlet orifices affording communication between said inlet orifices and the associated ones of said passages, means closing the ends of said bore, a spool type metering element of less length than said bore mounted for reciprocation in said bore and comprising a body member carrying a bearing disc at each end and at the mid length thereof loosely engaging the portions of said bore in said side walls and said partition; the lengths of said portions of said bores being slightly greater than the difference in length of said metering element and said bore; said metering element body further carrying metering discs disposed at the downstream sides of said primary metering orifices and so disposed thereon that when said metering element is at mid travel position, said metering discs will be spaced from their adjacent primary metering orifices by a distance which is substantially half the extent of travel of said metering element, separate fluid conducting means extending from each end of said bore to points slightly upstream of said outlet orifice, separate pilot valve means in each of said fluid conducting means, and dynamic pressure responsive devices including a pair of spring biased vane elements each separately yieldingly opposing the separate fluid flows out of said passage effective to open the one of said pilot valve means in the fluid conducting means connected to the end of said bore adjacent the inlet orifice subjected to the inferior dynamic pressure with resultant lessening of the inferior dynamic pressure resistance to movement of said metering element by the superior dynamic pressure and increase in the sensitivity of the metering element in the response thereof to input dynamic pressure differentials.

4. In a fluid flow proportioning device, a body having two inlet orifices and a single outlet orifice for the combined flows of said inlet orifices, separate fluid passageways connecting each inlet orifice with said outlet orifice, a pair of metering orifices disposed one each in each of said passageways, said metering orifices being spaced from each other in a common axial line, a spool type primary metering element mounted for free sliding movement in said axial line and carrying a pair of oppositely disposed flow limiting members disposed one each adjacent to each of said metering orifices, and other means carried by said primary metering element disposed thereon to be subjected to pressure differential opposing effects deriving from the dynamic pressures in said respective separate fluid passageways with resultant compensatory movement of said primary metering element and effective when subjected to equal pressure effects thereon to move said primary metering element to a position in said axial line in which said flow limiting members are equally spaced from said metering orifices and in the presence of a differential in the pressure effects applied thereon to move said primary element in a direction to tend to restrict flow through the metering orifice subjected to the greater dynamic pressure while maintaining the desired proportion in the two flows, and dynamic pressure responsive devices disposed downstream of said primary metering element effective to yieldingly oppose fluid flow through said passageways and resultantly operative to create back pressure effects on said other means carried by said primary metering element proportional to the dynamic pressures imposed on said dynamic pressure responsive means with resultant amplification of the dynamic pressure effects on said primary metering element.

5. A fluid flow proportioning device as claimed in claim 4 in which said spool type primary metering element comprises an enclosed, rigid hollow member carrying a series of axially aligned, laterally spaced discs mounted thereon constituting said flow limiting members and said other means, and is wholly immersed in the fluid.

6. A fluid flow proportioning device as claimed in claim 4 including separate fluid conduit means connected to and extending parallel to said passageways and by-passing said yielding, flow opposing means, valve means in said fluid conduit means, and actuating means for said valve means connected to and operated by said yielding, flow opposing means to admit fluid flow through the one of said fluid conduit means which is connected to the one of said passageways subjected to the lesser dynamic pressure with consequent reduction in the resistance of said primary metering element to an imposed superior dynamic pressure and resultant further increase in the sensitivity of said primary metering element to differentials in the dynamic pressures in said inlet orifices.

7. A fluid flow proportioning device as claimed in claim 6 in which said spool type primary metering element comprises an elongated enclosed hollow rigid member carrying a series of axially aligned, laterally spaced discs thereon and constituting said flow limiting members and said other means.

8. A fluid flow proportioning device as claimed in claim 6 in which said valve means includes adjustment means operable to vary the extent of dynamic pressure differential required to effect operation of said valve means.

9. In a fluid flow proportioning device, a hollow body having two inlet orifices and a single outlet orifice, separate fluid conducting passages connecting said inlet orifices with said outlet orifice, a pair of metering orifices disposed one each in each of said passages in spaced relation to each other along a common axial line, a spool type metering element mounted for reciprocation in said axial line and including a pair of flow opposing members disposed one each at the downstream side of each of said metering orifices, other means carried by said metering element rendered operative by the presence of equal dynamic pressures in said inlet orifices to move said metering element to a position along said line in which said members are equally spaced from said metering orifices and in the presence of a differential in the dynamic pressures in said inlet orifices to move said metering element to a position restricting the rate of flow through the metering orifice in communication with the inlet orifice subjected to to the greater of the dynamic pressures, and spring biased, yielding, dynamic pressure responsive devices disposed in each of said passages downstream of said metering element operative to create back pressures on said other means proportional to the dynamic pressures imposed by fluid flow past said spool-type metering element and impinging on said yielding, flow responsive devices with resultant increase of the sensitivity of said metering element in the response thereof to imposed dynamic pressure differentials.

10. In a flow proportioning device, a hollow body having two inlet orifices and a single outlet orifice for the combined flows of the two inlet orifices, separate fluid conduit means connecting each of said inlet orifices with said outlet orifice, a primary metering orifice and a secondary metering orifice arranged in downstream succession in one of said fluid conduit means between one of said inlet orifices and said outlet orifice, corresponding primary and secondary metering orifices similarly arranged between the other of said inlet orifices and said outlet orifices in the other of said fluid conduit means; said primary metering orifices being disposed in one axial line and said secondary orifices being arranged in another axial line, a primary metering means comprising a spool type primary metering element disposed in the axial line of said primary metering orifices and freely slidable in said axial line for dynamic pressure responsive movement and including disc members downstream of said primary metering orifices and adjacent thereto effective upon imposition of a differential dynamic pressure thereon to tend to limit flow through the one of the primary metering orifices which may be subjected to a superior dynamic pressure, spring biased, dynamic pressure responsive devices disposed for yielding, dynamic pressure responsive movement in relation to said secondary metering orifices, pilot valve means proportionately actuated by said yielding, dynamic pressure responsive movement of said spring biased means, and other fluid conduit means controlled by said pilot valve means effective to reduce the resistance to the lesser of two dynamic pressures imposed on said primary metering element through said inlet orifices with resultant increase in the sensitivity of said primary metering element to dynamic pressure differential in said inlet orifices.

11. In a fluid flow proportioning device, a hollow body having two inlet orifices and a single outlet orifice for the combined flows of said inlet orifices, separate fluid conduit means connecting each of said inlet orifices with said outlet orifice, a pair of metering orifices disposed one each in each of said fluid conduit means; said metering orifices being disposed in a common axial line, a spool type, primary metering element mounted for free sliding movement in said axial line and carrying a pair of flow opposing discs disposed one each adjacent to the downstream side of each of said metering orifices and means carried by said primary metering element rendered effective by the presence of equal dynamic pressures in said inlet orifices to maintain said discs equally spaced from their respective metering orifices and by the presence of a dynamic pressure differential, rendered effective to move said primary metering element in a direction tending to restrict the volume of flow through the metering orifice subjected to the superior dynamic pressure while maintaining the desired relative proportions in the two flows, a second pair of fluid conduit means extending generally parallel to said first named pair of fluid conduit means, pilot valve means disposed in said second pair of fluid conduit means downstream of said metering orifices, and pilot valve operating means in said first named fluid conduit means also disposed downstream of said primary metering orifices yieldingly responsive to an effect of the said superior dynamic pressure and operating by said response to actuate said pilot valve means to permit additional fluid flow from the side of said primary metering element subjected to the inferior dynamic pressure with resultant lessening of the response of said primary metering element to the inferior dynamic pressure imposed thereon with consequent increase in the sensitivity of said primary metering element to the dynamic pressure differentials imposed thereon and more rapid equalization of the respective input fluid flows in the desired proportion.

12. In a fluid flow proportioning device, a hollow body having two separate inlet orifices and separate passages leading one each from each of said inlet orifices to a single outlet orifice for the combined fluid flows of said inlet orifices said passages including metering orifices adjacent to said inlet orifices, a metering element responsive to differentials in dynamic pressures in said inlet orifices and moveable relative to said metering orifices to tend to restrict fluid flow through the one of said metering orifices subjected to a greater dynamic pressure than the other metering orifices and to simultaneously lessen the restriction to flow in the said other metering orifice, a pair of fluid conduit means extending one each from points closely adjacent to the downstream sides of the respective metering orifices to said outlet orifice, flow regulating means disposed in said fluid conduit means, control means for said flow regulating means including a pair of members yieldingly opposing flow through one each of said passages and responsive to the differential in the dynamic pressures imposed thereon through said metering orifices to cause said flow regulating means to lessen the resistance of said metering element to the said greater dynamic pressure by opening to permit increased flow through the one of said fluid conduit means leading from the metering orifice subjected to the lesser input dynamic pressure with resultant increase in the sensitivity of said metering element to respond to variations of dynamic pressure differentials in said inlet orifices.

13. In a flow proportioning device, a hollow body having two inlet orifices and a single outlet orifice for the combined flows of the two inlet orifices, separate fluid passages connecting each inlet orifice with said outlet orifice, a primary metering orifice and a secondary metering orifice arranged in downstream succession in each of said passageways, said primary metering orifices being spaced from each other in an axial line, a primary metering element disposed for free sliding movement in the axial line of said primary metering orifices and having surfaces disposed normal to said axial line opposed to wall surfaces of said body and effective in the presence of differentials in the pressures between said element surfaces and the associated wall surfaces to impart dynamic pressure responsive movement to said primary metering element tending to limit flow through the primary metering orifice subjected to the superior dynamic pressure, dynamic pressure responsive means disposed downstream of said primary metering orifices including a pair of equally spring biased flow opposing surfaces normally yieldingly urged to tend to close said secondary metering orifices in opposition to fluid flow therethrough, separate fluid conduit means extending from said wall surface portions of said body to said outlet orifice, and a pair of stationary pilot valves controlling flow through said fluid conduit means and devices actuated by said spring biased, flow opposing surfaces in response to differential dynamic pressures thereon, said last named fluid conduit means including separate fluid discharge port means for each of said pilot valves, said devices being effective to increase the opening of the one of said fluid discharge port means serving the one of said fluid conduit means connected to the one of said wall surface portions bounding an area subjected to the lesser dynamic pressure and simultaneously and proportionately closing the other of said fluid discharge port means with resultant increase in the sensitivity of said primary metering element to input dynamic pressure differentials.

14. In a fluid flow proportioning device, a hollow body having two inlet orifices and a single outlet orifice for the combined flows of said inlet orifices, separate fluid passageways connecting each of said inlet orifices with said outlet orifice, a pair of primary metering orifices spaced from each other one each in each of said passageways; said primary metering orifices being disposed in a common axial line, a spool type primary metering element mounted for free sliding movement in said axial line and carrying a pair of oppositely disposed flow limiting members disposed one each adjacent to and at the downstream side of each of said primary metering orifices and other means carried by said primary metering element effective in the presence of equal dynamic pressures in said inlet orifices to maintain said flow limiting members equally spaced from their respective primary metering orifices and in the presence of a dynamic pressure differential, to move said primary metering element to tend to restrict the volume of flow through the one of the primary metering orifices which is subjected to the superior dynamic pressure while maintaining the desired relative proportions of the two flows, and dynamic pressure responsive devices disposed downstream of each of said primary metering orifices operative in the presence of a differential in the dynamic pressure in said primary metering orifices to bypass a portion of the fluid from the side of said primary metering element subjected to the lesser dynamic pressure to said outlet orifice with resultant decrease in the resistance of said primary metering element to the superior one of the two dynamic pressures imposed on said primary metering element through said inlet ports; said pressure responsive devices including a pair of separate fluid conduit means effective to conduct respective portions of the fluid from the downstream sides of said primary metering orifices to said outlet orifice, valve means in each of said fluid conduit means, and actuating devices for said valve means disposed in said fluid passageways and responsive to dynamic pressure differentials in said passageways to vary the proportion of flow through said fluid conduit means reversely to the differential in said fluid passageways.

References Cited in the file of this patent

UNITED STATES PATENTS

| | | |
|---|---|---|
| 1,807,040 | Leonard | May 26, 1931 |
| 1,842,825 | Cunningham | Jan. 26, 1932 |
| 1,993,790 | Kinsella | Mar. 12, 1935 |
| 2,763,279 | Godden et al. | Sept. 18, 1956 |
| 2,772,065 | Thomas | Nov. 27, 1956 |